United States Patent [19]
Sutton

[11] Patent Number: 5,887,167
[45] Date of Patent: *Mar. 23, 1999

[54] SYNCHRONIZATION MECHANISM FOR PROVIDING MULTIPLE READERS AND WRITERS ACCESS TO PERFORMANCE INFORMATION OF AN EXTENSIBLE COMPUTER SYSTEM

[75] Inventor: Carl D. Sutton, Palo Alto, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 553,104

[22] Filed: Nov. 3, 1995

[51] Int. Cl.⁶ .................................................. G06F 9/46
[52] U.S. Cl. .......................... 395/676; 395/677; 395/680
[58] Field of Search .................................. 395/677, 680, 395/676

[56] References Cited

U.S. PATENT DOCUMENTS

| | | | |
|---|---|---|---|
| 3,818,458 | 6/1974 | Deese | 340/172.5 |
| 3,906,454 | 9/1975 | Martin | 340/172.5 |
| 4,849,879 | 7/1989 | Chinnaswamy et al. | 364/200 |
| 5,220,562 | 6/1993 | Takada et al. | 370/85.13 |
| 5,301,290 | 4/1994 | Tetzlaff et al. | 395/425 |
| 5,305,448 | 4/1994 | Insalaco et al. | 395/425 |
| 5,347,649 | 9/1994 | Alderson | 395/600 |
| 5,379,406 | 1/1995 | Wade | 395/500 |
| 5,440,545 | 8/1995 | Buchholz et al. | 370/60 |
| 5,485,574 | 1/1996 | Bolosky et al. | 395/183.11 |
| 5,555,396 | 9/1996 | Alferness et al. | 395/474 |
| 5,581,482 | 12/1996 | Wiedenman et al. | 364/550 |

OTHER PUBLICATIONS

Kleiman et al, Symmetric Multiprocessing In Solaris 2.0, Compcon Spring 92 San Francisco CA p. 181 1992.
F. Fotouhi et al., "The Generalized Index Model for Object–Oriented Database Systems", IEEE, 1991 (pp. 302–308).
E. Horowitz et al., "Fundamentals of Computer Algorithms", 1978 (pp. 48,58,59 & 63).

Primary Examiner—Lucien U. Toplu
Attorney, Agent, or Firm—Cesari and McKenna, LLP

[57] ABSTRACT

A synchronization arrangement provides writer and reader entities access to an information resource, such as a trace buffer, located in a registry of a computer. The arrangement comprises a counter upon which atomic increments are performed to allocate entries of the trace buffer for temporarily storing trace message fragments provided by the writer entities. The arrangement also comprises reassembly queues for temporarily storing the message fragments sequentially retrieved from the trace buffer by the reader entities.

17 Claims, 7 Drawing Sheets

SYNCHRONIZATION MECHANISM FOR PROVIDING MULTIPLE READERS AND WRITERS ACCESS TO PERFORMANCE INFORMATION OF AN EXTENSIBLE COMPUTER SYSTEM

CROSS-REFERENCE TO RELATED APPLICATIONS

This invention is related to the following copending U.S. Patent Applications:

U.S. patent application Ser. No. (P1762) titled, EXTENSIBLE PERFORMANCE STATISTICS AND TRACING REGISTRATION ARCHITECTURE; and U.S. patent application Ser. No. (P1764) titled, RUN-TIME DATA TYPE DESCRIPTION MECHANISM FOR AN EXTENSIBLE COMPUTER SYSTEM, each of which was filed on even date herewith and assigned to the assignee of the present invention.

FIELD OF THE INVENTION

The invention relates generally to collecting performance metrics for software executing on a computer system and, more specifically, to a synchronization mechanism for providing multiple readers and writers access to performance information collected by an operating system and applications of the computer system.

BACKGROUND OF THE INVENTION

Software instrumentation generally includes software entities used for collecting, storing and retrieving performance metrics of a computer system. These software entities typically include writer entities for collecting the performance information and storing that information in a designated area of main memory, called a repository. The repository preferably holds the performance information for retrieval by reader entities, which may include application programs executing on the computer.

Namespace services impose a uniform structure on the information stored in repositories. A namespace is a collection of information managed by an operating system of the computer and a namespace service, or registry, is the entity that stores and organizes that information. The registry generally provides an application programming interface (API), which is a mechanism for an application program to obtain services from the operating system. APIs typically include a collection of system calls to the operating system requesting, for example, establishment of network connections on behalf of an application. Specifically, the application may, via system calls to the registry API, create, modify, request, add and delete information in the registry.

The performance information collected at the registry typically includes metrics relating to components of the computer system, such as a central processor unit (CPU), main memory, the operating system and input/output (I/O) system. Examples of the collected information include loading metrics of the CPU and bandwidth parameters of the memory, along with timing latencies for execution of a particular request involving the I/O system, e.g., how long it takes to complete the (entire or portions of the) request.

By collecting and retrieving performance information, the software instrumentation provides access to the internal state and behavior, i.e., "views", of the operating system and application software executing on the computer. Operating systems are complex pieces of software configured to, e.g., handle asynchronous events within a computer (such as interrupts from I/O devices), provide interprocess communication capabilities and implement complex network protocols. Operating systems also control execution of application programs; instances of those programs in execution are called processes.

Knowledge of the internal characteristics of an operating system and application processes is useful for debugging, optimization and design verification of a computer. The internal views provided by software instrumentation fall into two general categories: (i) tracing, which provides a view into the behavior of a software program by recording the time and details of its state at interesting points in a running system, and (ii) statistics, which record when and how resources, such as device drivers of the operating system, are used.

Tracing is a broadcast form of interprocess communication with many source processes (e.g., writer entities) and sink processes (e.g., reader entities) capable of observing each other's execution; a trace, therefore, consists of a display that chronicles the actions and results of program execution. Specifically, the trace provides a detailed record of the program's execution path by, e.g., taking an application program and placing it under observation by a special routine that monitors the progress of the program.

Performance information obtained by writer entities engaged in tracing operations are typically provided to the registry as trace messages. Each trace message has a variable length and is stored in portions of the registry configured to accomodate such variable-length messages. Specifically, each message is stored in a trace buffer having a circular structure consisting of a fixed number of equally-sized entries; each entry generally has a capacity sufficient to store a portion or fragment of the variable-length trace message.

A plurality of messages and corresponding fragments are generally interleaved within the trace buffer, which is typically shared among the software entities. As a result, the trace buffer may be accessed by multiple writer entities attempting to load messages into the buffer and multiple reader entities attempting to retrieve those messages. The broadcast nature of tracing indicates that all reader entities may observe successful retrieval of each trace message. Typically, the reader entities determine whether there are any new messages to retrieve by constantly polling the trace buffer; depending on the quantity of readers continually accessing the buffer, such activity could completely exhaust system resources.

Each writer entity, on the other hand, merely "posts" messages in the buffer independent of reader activity. Prior to posting those messages, the writer must typically process the messages to determine their lengths so that it can allocate a sufficient number of entries of the buffer. However, coordinating and managing such allocation may be difficult, particularly when attempting to recover from a writer entity that "dies", i.e., stops functioning, in the midst of processing a message. If such recovery is not swift and efficient, other writers may be "blocked" from placing messages in the buffer, thereby disrupting operation of the system.

Therefore, it is among the objects of the invention to provide a mechanism for limiting the quantity of reader entities constantly accessing a trace buffer of a registry so as to conserve system resources.

Another object of the present invention is to provide a mechanism for ensuring that a writer entity does not block other writer entities from posting messages in a trace buffer of a registry.

SUMMARY OF THE INVENTION

Briefly, the invention relates to a synchronization arrangement for providing writer and reader entities access to an information resource, such as a trace buffer, located in a registry of a computer. The novel arrangement generally comprises a counter upon which atomic increments are performed to allocate entries of the trace buffer for temporarily storing trace message fragments provided by the writer entities. The arrangement further comprises reassembly queues for temporarily storing the message fragments sequentially retrieved from the trace buffer by the reader entities.

In an alternate embodiment of the invention, the synchronization arrangement includes a mechanism for statistics collection comprising an enable bit, located within a base node of the registry, for accessing the memory storage location of the performance information, along with the use of atomic instructions for updating the statistics information.

In the illustrative embodiment, the trace buffer is configured to store performance information, such as traces, for a registry of the memory. The trace buffer comprises a fixed number of equally-sized entries, each having a capacity sufficient to store a fragment of a variable-length trace message. Specifically, each message fragment contains a fragment number and a sequence number, the latter of which is sequentially assigned to each message prior to being apportioned into fragments for storage in the buffer.

Each reader entity maintains a reassembly queue on which the contents of the fragment entries are placed as they are sequentially retrieve from the trace buffer. The fragments are preferably grouped by sequence number and ordered by fragment number. When a complete message is assembled and reaches the head of the queue, the reader unloads the message from the queue and forwards it to a component of the computer for processing.

The reader entities are generally responsible for detecting lost, incomplete or missed messages with respect to the trace buffer; preferably, the reassembly queue, in addition to a time-out mechanism, are used to detect these conditions. According to an aspect of the invention, writer entities always write fragments into the buffer in order so that missing fragments (other than the last fragment) can be easily detected. A missing last fragment may be detected using the time-out mechanism comprising a predetermined threshold established with respect to the contents of the counter. If the contents of the counter exceed this threshold before all the fragments of a message are retrieved by a reader, then the reader may assume that the fragment (and, thus, the message) is irretrievably lost.

In another aspect of the invention, the novel arrangement further includes a barrier synchronizer for limiting the number of reader entities constantly accessing the trace buffer to retrieve trace messages posted by the writer entities. The barrier is preferably implemented as a lock mechanism that periodically "awakens" reader entities suspended in idle states waiting to access the trace buffer in response to an event, such as the loading of a certain number of message fragments.

Advantageously, the synchronization arrangement increases the efficiency and performance of a computer system during performance information collection by ensuring that a writer entity does not block other writer entities from accessing an information resource. In addition, the novel arrangement regulates the "overhead" associated with retrieving information from an information resource by limiting the number of reader entities constantly accessing that resource. Moreover, the novel time-out mechanism ensures that messages are reliably exchanged among the writer and reader entities.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
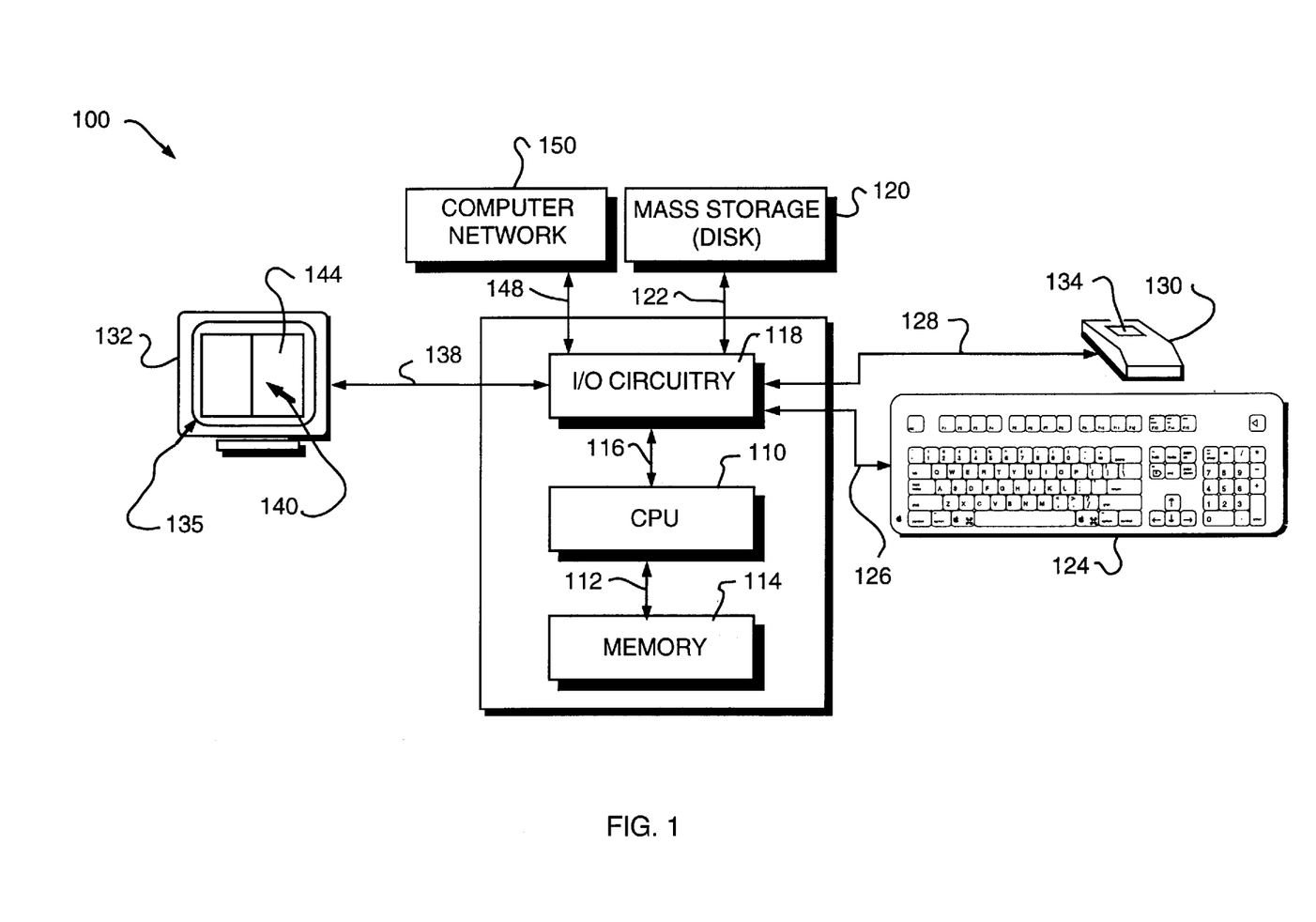
FIG. 1 is a block diagram of a computer, such as a personal computer, on which the invention may advantageously operate.

FIG. 1 illustrates a typical hardware configuration of a computer 100 comprising a central processing unit (CPU) 110 coupled between a main memory 114 and input/output (I/O) circuitry 118 by bidirectional buses 112 and 116. The memory 114 typically comprises random access memory (RAM) for temporary storage of information, including application programs (not shown), and read only memory (ROM) for permanent storage of the computer's configuration and basic operating commands, such as portions of an operating system (not shown). The application programs and operating system interact to control the operations of the CPU 110 and computer 100.

The I/O circuitry 118 is, in turn, connected to a mass storage unit 120, such as a disk drive, via a bidirectional bus 122 and to computer network 150 via bidirectional bus 148. Cursor/pointer control devices, such as a keyboard 124 and a mouse 130, connect to the circuitry 118 via cables 126 and 128, respectively. The mouse 130 typically contains at least one button 134 operated by a user of the system. A conventional display monitor 132 having a display screen 135 is also connected to I/O circuitry 118 via cable 138. A pointer (cursor) 140 is displayed on the screen 135 and its position is controllable via the mouse 130 or the keyboard 124, as is well-known.

Specifically, the I/O circuitry 118 receives information, such as control and data signals, from the mouse 130 and keyboard 124, and provides that information to the CPU 110 for transfer over the network 150, storage on the mass storage unit 120 or for display on the screen 135. It is to be understood that the I/O circuitry contains the necessary hardware, e.g., buffers and adapters, needed to interface with the control devices, the display monitor, the network and the mass storage unit. Moreover, the operating system includes the necessary software drivers to control, e.g., adapters within the I/O circuits when performing I/O operations, such as the transfer of data to and from the storage unit 120 and network 150.

The computer 100 is preferably a personal computer of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 2:
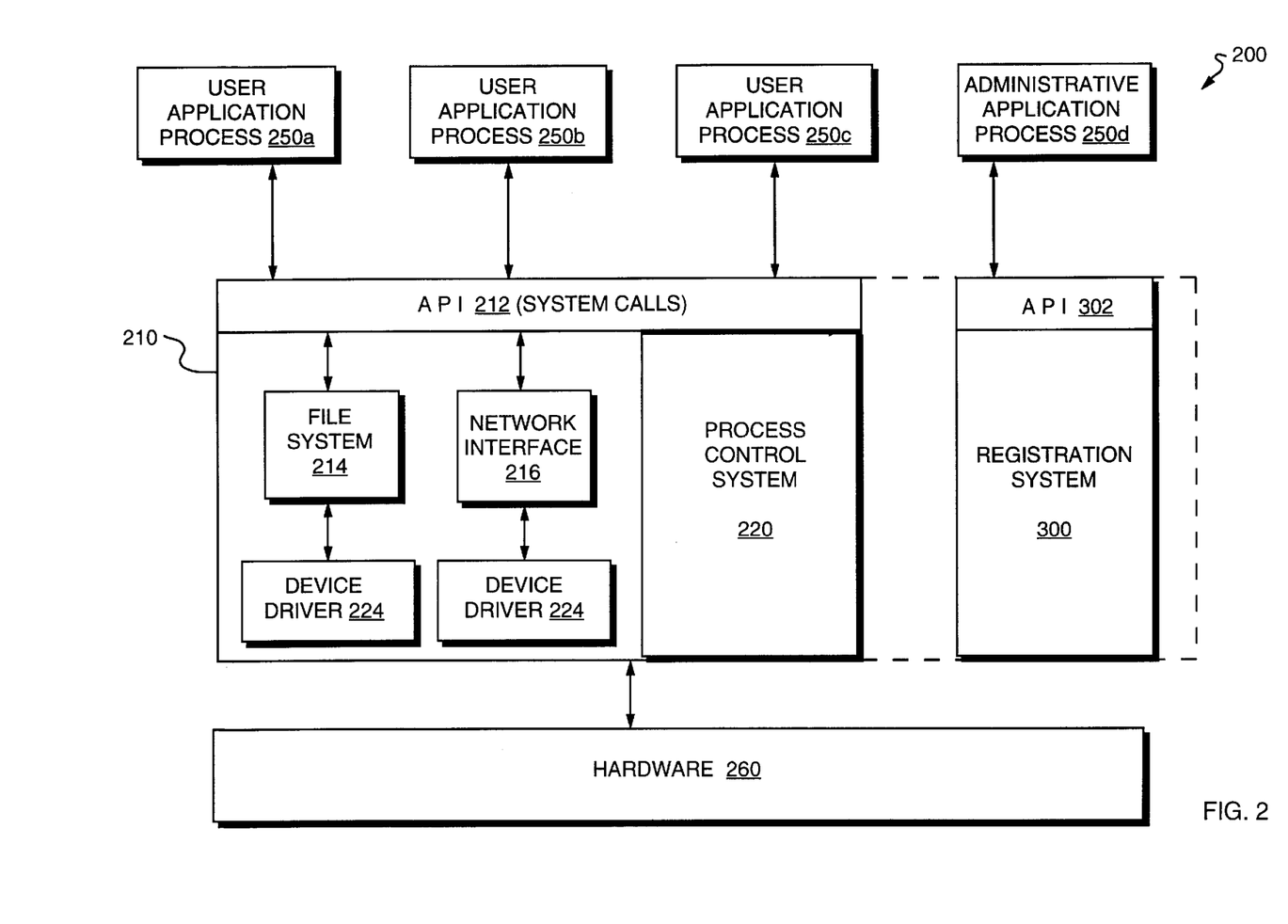
FIG. 2 is a highly schematized diagram of the hardware and software elements of the computer that includes a registration system of the invention.

FIG. 2 is a highly schematized block diagram of the hardware and software platform 200 of computer 100. As noted, instances of application programs executing on the computer 100 are manifested as processes 250. The operating system organizes the computer by tracking, suspending and resuming execution of the processes, while allocating to them the CPU and other system resources. Although these application processes are typically user processes 250a–c, they may also include administrative processes 250d configured to perform various, "welfare-type" control functions described further herein.

Processes 250 typically interface with operating system 210 via system calls of an application programming interface (API) layer 212. Beneath the API layer are system facilities such as file system 214 and network interface 216, each of which directly implement those system calls. Process control system 220 provides basic capabilities of the operating system, such as interprocess communication and memory management.

The lower-layer of operating system 210 includes device drivers 224 for interfacing directly with the computer hardware 260. For each physical device, such as mass storage unit 120, a device driver is provided to accept requests to read and write data or determine the status of the devices. Communication between the physical devices and CPU 110 may be effected either through polling of the device drivers or via interrupts.

Located adjacent to operating system 210 is a registration system 300 configured to provide a hierarchical registration architecture which enhances the organization of performance information, such as statistics and tracing, collected by software instrumentation of the operating system and/or application programs executing on the computer. The "side-by-side" arrangement between the operating system 210 and registration system 300 enables the registration system to monitor the behaviour of the operating system and its various facilities. Accordingly, the registration system 300 includes its own, independent API communication facilities 302 for, inter alia, collecting performance information for the operating system 210.

Figure 3:
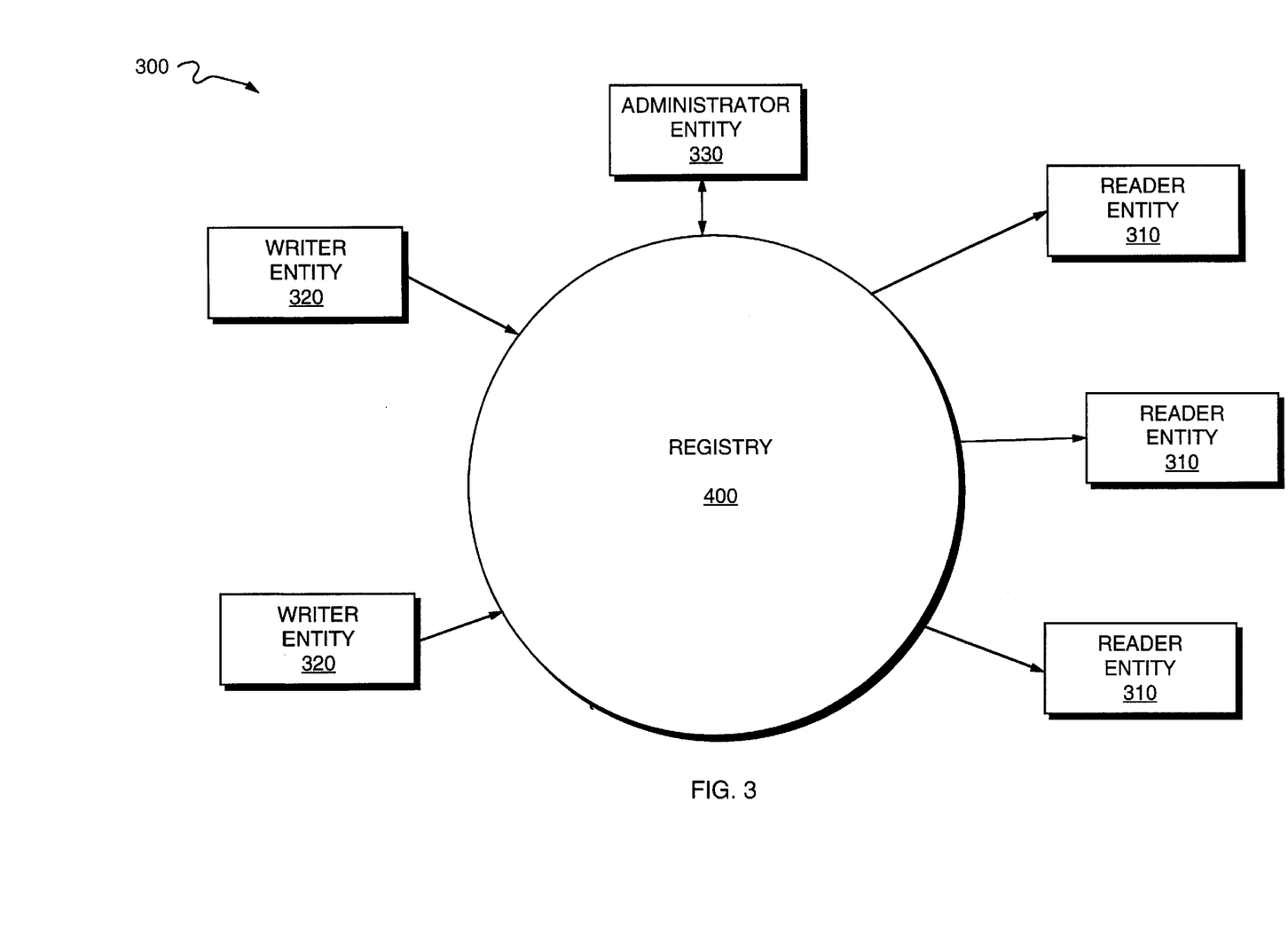
FIG. 3 is a highly schematized diagram of the registration system, including reader, writer and administrator entities interacting with a registry of the present invention.

FIG. 3 is a highly schematized diagram of the registration system 300 including software instrumentation of the present invention. In general, the software instrumentation comprises software entities for collecting, storing and retrieving performance information relating to the computer platform 200. That is, the software entities include a registry 400 for storing performance information collected by writer entities 320, retrieved by reader entities 310 and controlled by an administrator entity 330.

The reader entities 310 typically include user application processes 250a–c desirous of obtaining performance information from the registry 400, while the writer entities 320 include those processes along with operating system components, such as device drivers 224, configured to collect performance information and "write" that information to the registry. The administrator entity 330 typically comprises adminstrative process 250d and is depicted as interacting with registry 400 via a two-headed arrow; this denotes that administrative process 330 is capable of directly writing information into and reading information from the registry 400 in connection with its overall control functions described herein.

Figure 4:
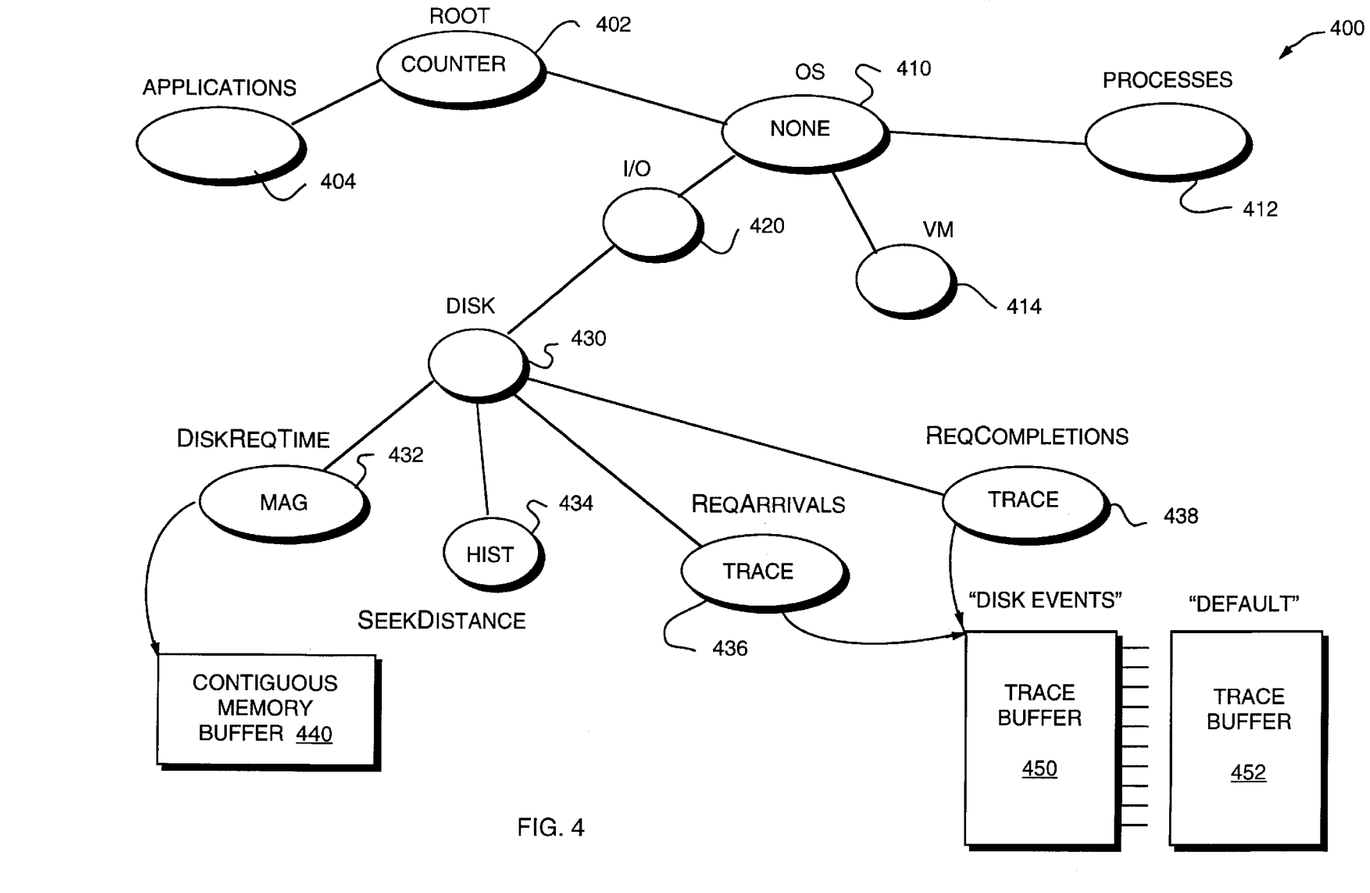
FIG. 4 is a block diagram of the registry for organizing and managing object nodes in accordance with the invention.

FIG. 4 is a block diagram of the registry 400 embodying a hierarchical tree data structure architecture of nodes for managing and organizing performance information, such as statistics and tracing, collected by writer entities 320. Each node represents a single data item with a single data type; in addition, data collection presented by each node of the tree can be independently enabled and disabled. The multi-linked tree structure is located within main memory 114 (FIG. 1) having a plurality of address locations for accessing the performance information. An example of a registry is provided in copending and commonly assigned U.S. Patent Application titled *Extensible Performance Statistics and Tracing Registration Architecture,* filed on even date herewith, which application is incorporated by reference as though fully set forth herein.

In a preferred embodiment, the invention described herein is implemented as a dynamic object-oriented system, using C language in connection with object-oriented programming (OOP) techniques. The C language is well-known and many articles and texts are available which describe the language in detail. In addition, C compilers are commercially available from several vendors. Accordingly, for reasons of clarity, the details of the C language and the operation of its compiler will not be further discussed.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item.

Objects are defined by creating "classes" which are not objects themselves, but which act as templates that instruct the compiler how to construct an actual object. A class may, for example, specify the number and type of data variables and the steps involved in the functions which manipulate the data. Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The registration architecture described herein does not employ traditional inhertance mechanisms; instead, it employs a run-time data type extension mechanism that distinguishes the dynamic object-oriented nature of the system. That is, instead of determining the data type at compile time, that data type is determined at run time. An example of a run-time data type extension mechanism is provided in copending and commonly assigned U.S. Patent Application titled *Run-time Data Type Description Mechanism for an Extensible Computer System,* filed on even date herewith, which application is incorporated by reference as though fully set forth herein.

The writer entities 320 "register" their intent to collect and store performance information in registry 400 by creating objects as nodes organized within the tree structure. Specifically, the writer entities 320 are designated as various portions of the tree structure and the information they collect are also described as object nodes of the tree. Each object node is preferably named according to the performance information it collects and, also, the type of data with which it is associated. For example, the root object node 402 of registry 400 is named Root and has an associated counter (Counter) data type.

Readers, on the other hand, are entities that use or examine the information for purposes of displaying it on a computer screen, recording it to a disk or sending it over a network. The reader entities are generally independent and do thus not interact, primarily because a reader's state is local to the reader. Therefore, when a reader fails, there is no "global" state to clean-up. There can be multiple entities reading and writing information from and to the registry 400. Significantly, each reader entity has access to all of the information collected by the writer entities within the computer. The registration mechanism of the architecture described herein allows these writers to inform the readers with respect to information recorded in the registry 400.

For example, the OS node 410 collects performance information for the operating system software and, in the illustrative embodiment, is used merely as an organization mechanism for the lower nodes of the tree; accordingly, this node has no associated data type. The information collected at the lower nodes of the OS node are apportioned into categories such as process-related information at Process node 412, virtual memory performance information at VM node 414 and I/O-related information at I/O node 420. This latter node includes the collection of disk-related performance information at Disk node 430.

Specifically, the node that collects statistics pertaining to times for completing disk requests is DiskRequestTime node 432; as described further herein, this node has an associated magnitude (Mag) data type. In addition, SeekDistance node 434 provides a histogram (Hist) of seek distances on the disk, e.g., how far a disk head moves for each request, while ReqCompletions node 438 provides a trace (Trace) of disk request completion times and ReqArrivals node 436 also provides a trace (Trace) of disk request arrival times. As for these latter data types, whenever a request arrives at device driver 224, a trace event, i.e., a trace message containing a description of the request, is issued; an example includes a request to a disk driver to read a particular block on disk.

Examination of the data associated with the object nodes indicates the frequency and traffic patterns of, e.g., requests arriving at the disk driver (i.e., whether there are long or short gaps between requests). The data types described above generally relate to I/O system data collection; however, it is noted that the invention applies equally to collection of performance information from other entities, such as applications. For example, Applications node 404 is designated for collecting application-related performance information.

Operationally, the writer entities record performance information in the data buffers that the registration system 300 allocates to each node for each piece of information. The reader entities read that information from those buffers and perform various operations on it. The administrator entity controls whether any particular node's information collection is currently enabled or disabled. It is important that this latter function be controlled by a separate mechanism, e.g., a utility application, that is not directly under control of the writer.

Prior to collecting performance information for storage in registry 400, the writer entities 320 check whether collection is enabled for a particular piece of information. If a particular node is enabled, it collects the performance information and records that information in the registry. If the node is not enabled, then the writer cannot record the information. Hence, recording may be disabled for an object node; in the case of statistics collection, this implicitly "frees" the allocated memory buffer.

As a result of the tree structure architecture of the registry 400, the states of nodes with common ancestry may be modified as a group. That is, enablement and disablement of interior tree nodes, e.g., node 430 (FIG. 4), affect that node and all descendants of that node. Since extension nodes to the registry are typically created beneath a common node of the tree, information collection for the extensions can be controlled collectively or independently for each data element. As an example of the latter, the parameters within a disabled node can be changed, the node may be re-enabled and, if needed, a larger memory buffer may be allocated. The amount of memory associated with a node is thus fixed for the duration of enablement, and the node can be re-enabled to change that amount of allocated memory.

Storage of the performance information preferably occurs in globally-shared memory 114 so that any software entity can access or update the information. Portions of memory 114 are allocated as contiguous memory buffers 440 to those nodes configured to collect statistics information. That is, each of these "statistics" nodes, e.g., DiskReqTime node 432, contains a pointer to a contiguous portion of memory that is allocated to that node, e.g., data buffer 440. These allocated buffers are not shared among multiple nodes because the abstract data types for the statistic data structures are well-defined; accordingly, the amount of memory space allocated is specific to each data type.

Figure 5:
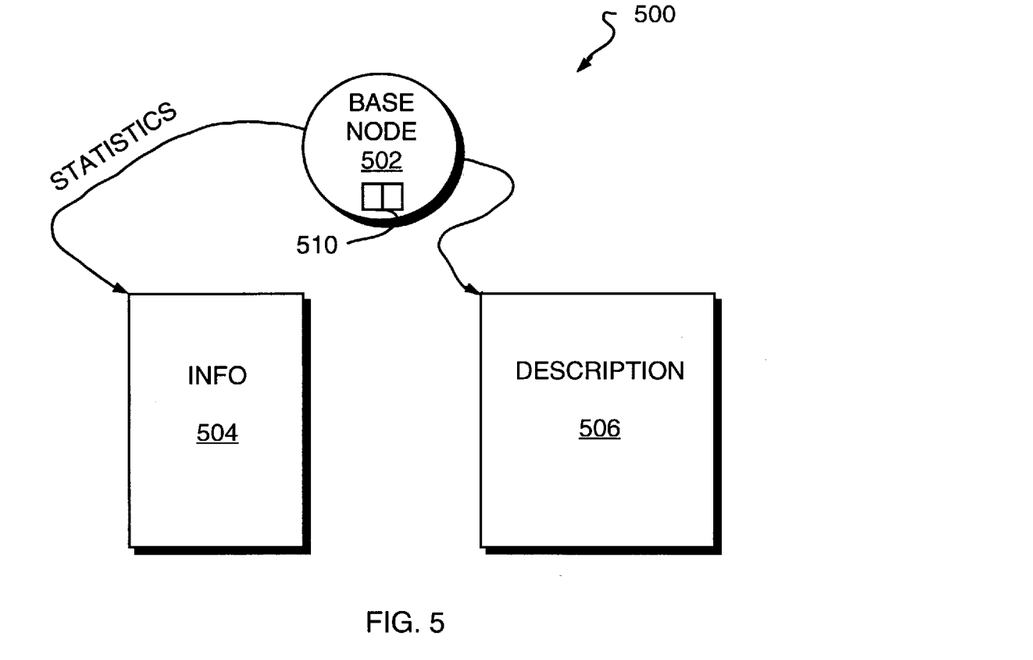
FIG. 5 is a block diagram of a novel object node configured to store performance statistics information using a buffer element and a description element in accordance with the invention.

FIG. 5 is a block diagram of a data type extension mechanism 500 comprising a base node 502 of the multi-linked tree having associated therewith a buffer (info) element 504 for storing the collected performance information and a description element 506 for describing that information. The base node 502 contains pointers to these buffer and description elements 504, 506 in memory. The buffer info element 504 is maintained separately from the description element 506 to facilitate their independent management.

The base node 502 further contains state information specifying whether information collection is enabled or disabled for the node. That is, access to the buffer element 504 for purposes of data collection is gated through the base node 502 via an enable indication bit 510. If the base node is enabled, i.e., the bit is asserted, then the buffer element 504 exists and writer entities can directly "write" information to the buffer, while reader entities can directly "read" that information.

Since this peformance information is stored in globally-shared memory, there may be instances where multiple writer entities may attempt to simultaneously access the buffer in order to update its contents. According to the present invention, a statistics synchronization technique is provided to avoid such contention when updating statistics collection. Specifically, an enable bit of the base node indicates whether information collection is enabled and, thus, access to the buffer element is enabled.

Coordination of updates of the collected statistics may be effected using atomic instructions for particular information collection data types. For example when updating a statistic using a counter data type, an atomic operation, e.g., a read-modify-write operation, is required because the counter has a current value. If the update involves incrementing that value, the contents of the counter must be read prior to adding one thereto, and the result is then written back to the counter. Since there may be multiple writer entities, the atomic operation basically "locks" the counter to avoid contention. The atomic operation preferably uses a hardware processor as the locking mechanism for the data item.

Referring again to FIG. 4, information storage for object nodes collecting trace information are provided by trace buffers 450, 452. As with the data buffers described above, the trace buffers are preferably linked to the trace nodes via pointers in those nodes. Unlike the contiguous memory buffers allocated to each statistics node, however, trace buffers are named and shared among multiple nodes primarily because of their large sizes.

Specifically, trace buffers are created in response to registration of object nodes in the registry 400; this is illustrated in FIG. 4 as trace nodes 436, 438 pointing to new shared trace buffer structure DiskEvents 450. If no trace buffer is specified for a particular trace node, that node points to a default buffer called Default trace buffer 452. It should be noted that trace buffers are used solely for collecting trace information in the form of trace messages.

Figure 6:
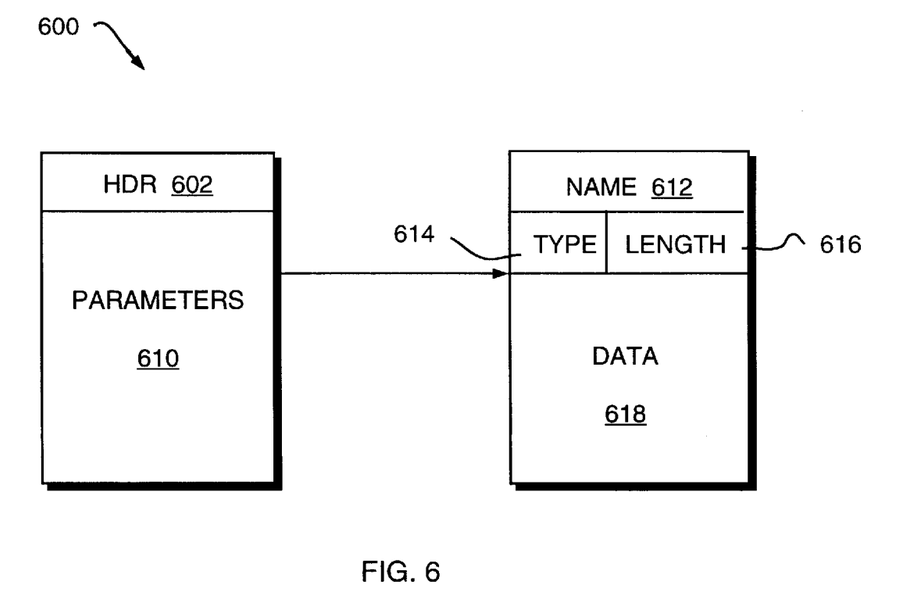
FIG. 6 is a block diagram of the novel object node configured to store trace messages using a trace buffer in accordance with the invention.

FIG. 6 is a block diagram of a variable-length trace message 600 stored in a trace buffer that is structurally equivalent to buffer 450. Each trace message 600 preferably contains both trace information and its description; these contents are typically intermingled within the entries of the buffer. A header 602 contains a plurality of values, including a length indicating the length of the variable-length message; a generalized time stamp for measuring execution time between different points in a program when generating a trace and a creator that identifies the node or group of nodes issuing the message. Specifically, the creator identifies a writer entity, e.g., the file system 214, that creates a set of nodes in a sub-tree.

Beyond the header information, there is also a parameter field 610 comprising the intermingled, extendable information of the trace message. Each parameter of field 610 further includes information such as a name 612, a type 614, a length 616 and, of course, data 618. Examples of a name 612 may include a simple maximum data type or a complex magnitude type. Significantly, there are variable quantities of parameters in field 610, with each parameter being of variable size depending on the particular data type.

The trace buffers are preferably configured as circular data buffers comprising a fixed number of equally-sized entries; each entry generally has a capacity sufficient to store a portion or fragment of the variable-length trace message. A plurality of trace messages and corresponding fragments may be interleaved in the trace buffer because of its circular structure. As a result, the trace buffer may be accessed by multiple writer entities attempting to post messages into the buffer and multiple reader entities attempting to retrieve those messages.

Specifically, all reader entities "see" all of the messages posted in the trace buffer; in this sense, the trace buffer functions as a broadcast communication mechanism. This is significant because it allows reader entities to implement specialized processing or filtering of a message stream without interfering with other readers.

Furthermore, writer entities do not maintain reader state, i.e., the writer entities do not count or otherwise track the existence of the reader entities, except implicitly in the implementation of barrier synchronization described below in connection with FIG. 9. Barrier synchronization is preferably implemented by the operating system; therefore, the software instrumentation does not require knowledge of the number of readers to implement the trace synchronization arrangement of the invention. This too is significant because writers do not need notification when readers pause, stop or terminate processing.

Prior to posting its messages, the writer entity typically processes the messages to determine their lengths so that it can allocate a sufficient number of entries of the buffer. As noted, coordinating and managing such allocation may be difficult, particularly when attempting to recover from a writer entity that "dies", i.e., stops functioning, in the midst of processing a message. If such recovery is not swift and efficient, other writers may be "blocked" from placing messages in the buffer, thereby disrupting operation of the system.

Figure 7:
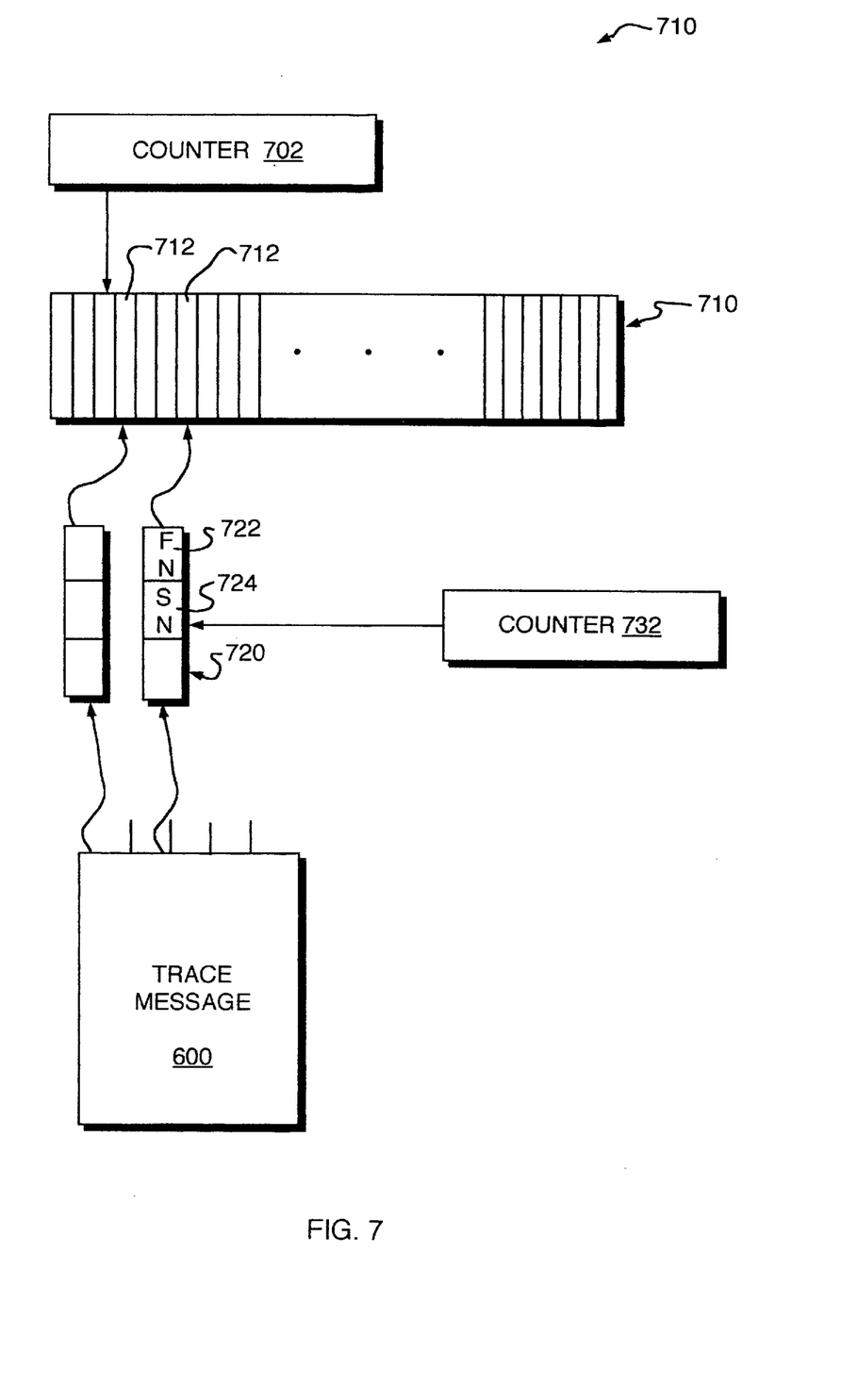
FIG. 7 is a schematized block diagram of a novel synchronization arrangement for writer entities to allocate entries of the trace buffer when posting trace messages in the registry.

In accordance with the invention, the trace synchronization arrangement is provided that allows writer and reader entities access to an information resource, such as a trace buffer, located in the registry. FIG. 7 is a schematized block diagram of the trace synchronization arrangement 700 comprising a fragment allocation counter 702 upon which atomic increments are performed by writer entities to allocate entries of a trace buffer 710 for temporarily storing trace message fragments provided by the writer entities.

The counter 702 is preferably a continuous rolling "up" counter whose contents comprises, e.g, a 32-bit word. A writer entity is allocated an entry in the buffer in response to performing an atomic increment on the counter. An atomic increment is, e.g., a read-modify-write atomic operation that effectively "locks" the counter from access by other entities as the writer increments the contents of the counter. Specifically, the writer entity that gains control of the counter increments its contents and performs a modulo operation on the resulting contents; this indicates which entry of the trace buffer has been allocated. The writer then copies a fragment of the message into that buffer entry.

As noted, trace buffer 710 generally consists of a fixed number (N) of equally-sized entries 712, each having a capacity sufficient to store a fragment 720 of a variable-length trace message 600. The size of each entry is typically determined at compile time and, in the illustrative embodiment, is preferably thirty-two bytes. Each message fragment 720 contains a fragment number (FN) 722 and a sequence number (SN) 724, the latter of which is sequentially assigned to each message prior to being apportioned into fragments for storage in the buffer.

Writer entities preferably allocate message sequence numbers using atomic increments of a global sequence counter 732, which is different from the trace buffer fragment allocation counter 702. In addition, a sequence number of "0" is invalid and never allocated to a writer entity.

Operationally, the writer entity increments the fragment allocation counter 702, thereby allocating one of the entries 712 of the buffer 710. For N entries, a particular entry may described by an atomic increment of the counter, modulo-N (which is the number of entries in the entire trace buffer):

$$\text{Entry} = (\text{++counter}) \bmod N$$

This provides the writer with the entry 712 that has been allocated. The writer then copies a first fragment from the message into the trace buffer entry, and then repeats the procedure to copy a next fragment of the message. The specific sequence of steps used by a writer when posting a message to the buffer is as follows:

(i) allocate a message sequence number using the sequence counter 732;

(ii) allocate an entry 712 of the trace buffer 710 using the fragment allocation counter 702;

(iii) write "0" to the sequence number field 724 of a fragment 720;

(iv) copy the fragment 720 of the message into the allocated entry of the buffer;

(v) write the allocated message sequence number to the sequence number field 724;

(vi) if all fragments are copied, the message is successfully posted; otherwise (vii) go to step (ii) and repeat.

Since there may be other writers allocating entries, each fragment of a message may be loaded into the trace buffer in a non-contiguous fashion. This technique allows management of variable-length entries in the buffer. Also, since writers use a "0"-valued sequence number to signify copying of a fragment into a trace buffer entry, reader entities interpret a timeout while reading a fragment with the "0"-valued sequence number as writer death.

It should be noted that the first fragment copied in the trace buffer is marked as the first message fragment and contains the last fragment number 722. Each successive fragment contains a fragment number decremented by one from the previous fragment. Thus, the last fragment in a message contains the first fragment number. A sequence number is, of course, common to all fragments of a single message. Since the trace message 600 also contains the length of the message, a reader entity retrieving message fragments 720 from the buffer 710 can determined when all of the fragments of a message have been obtained; it then re-assembles the fragments into a complete trace message, as described herein The novel arrangement also provides a means for avoiding allocation of a particular entry by multiple writers simultaneously accessing the buffer when the fragment allocation counter 702 advances more than N entries. Assume a writer entity is interrupted in the midst of copying fragments into the buffer and the period of interruption is sufficient to allow allocation of N additional entries to other writers. The next N+1 entry is already being copied into by the interrupted writer entity; however, this entry will also be allocated to a different writer entity, causing the two writers to collide.

The synchronization arrangement described herein avoids such a contentious situation by ensuring that the quantity of entries in the trace buffer is sufficient to withstand the maximum rate of entry usage within a predetermined process delay (i.e., writer interruption) time period. For example, if the maximum rate at which entries are allocated is one every 10 microseconds and the predetermined process delay is 5 seconds, then the trace buffer must have 500,000 entries. At 32 bytes per fragment/entry, a 16-megabyte trace buffer would be needed.

Figure 8:
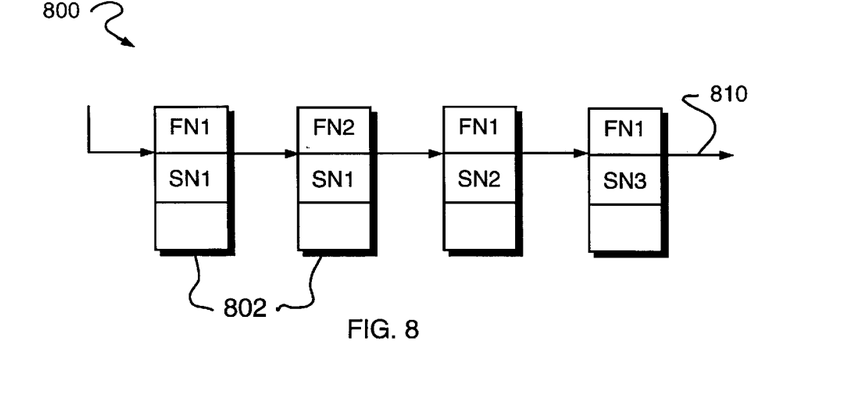
FIG. 8 is a schematized block diagram of a reassembly queue used by a reader entity to sequentially retrieve trace messages from the trace buffer.

In accordance with the invention, the arrangement further comprises reassembly queues for temporarily storing the message fragments sequentially retrieved from the trace buffer by the reader entities. FIG. 8 is a schematized block diagram of a reassembly queue 800 which, in the illustrative embodiment, is preferably a link-list data structure or an ordered queue. Specifically, each reader entity 310 maintains a reassembly queue 800 on which the contents of the fragment entries are placed as items 802 as they are sequentially retrieve from the trace buffer. As noted, each reader has access to the trace buffer in global memory; accordingly, the reader entity "steps through" each entry of the buffer, copying the contents of each fragment item 802 from the buffer and on to it's own reassembly queue 800.

Preferably, the fragment items 802 are grouped by sequence number (SN) and ordered by fragment number (FN). The reader entity is responsible for tracking the current sequence number as the last message retrieved. When a complete message is assembled and reaches the head 810 of the queue 800, the reader unloads the message from the queue and forwards it to a component of the computer for processing.

As noted, the reader entities are generally responsible for detecting lost, incomplete or missed messages with respect to the trace buffer; preferably, the reassembly queue, in addition to a time-out mechanism, are used to detect these conditions. According to an aspect of the invention, since writer entities always write fragments in order, fragments (other than the last fragment) that are missing can be easily detected. A missing last fragment may be detected using the time-out mechanism comprising a predetermined threshold established with respect to the contents of the counter 702. Specifically, if the contents of the counter exceed the threshold before all the fragments of a message are retrieved by a reader, then the reader may assume that the message is irretrievably lost. In the illustrative embodiment described herein, the predetermined threshold is preferably half the number of entries.

For example, assume there are 100 entries (with sequence numbers 1–100) in the trace buffer and the first fragment that is retrieved by a reader entity is fragment number 5 of message sequence number 50. If the counter 702 progresses to message sequence number 100 and the reader has yet to retrieve fragment numbers 1–4 of message sequence number 50, those fragments are presumed lost and that message is incomplete.

Moreover, each reader maintains a private copy of the contents of the fragment allocation counter 702. As a fragment is retrieved from the trace buffer, this private copy is compared with the contents of that counter. If the difference between the resulting values is greater than N (the number of trace buffer entries), the reader has missed at least one entire set of trace buffer fragments. Accordingly, the reader starts over with the oldest fragment in the buffer. The oldest fragment in a trace buffer may be calculated as follows:

$$\text{OldestEntry} = \text{counter} + 1 - N$$

The inventive arrangement further allows reader entities to detect whether a fragment in the trace buffer is overwritten while being read. Detection of such overwritten fragments is achieved according to the following reader algorithm:

(i) read the sequence number 724 (SN) from the trace buffer fragment 720;

(ii) copy the contents of that fragment;

(iii) read the sequence number 724 (SN) from the trace buffer fragment 720;

(iv) compare the two sequence numbers;
(v) if the sequence numbers match, the contents of the fragment are valid; otherwise,
(vi) go to step (i) and repeat.

The synchronization arrangement described above thus allows multiple writers and readers non-blocking access to an information resource, such as a trace buffer. That is, each writer entity has access to at least one entry of the trace buffer any time, while multiple reader entities may simultaneously access the buffer for purposes of retrieving messages posted by the writer entities. However, the reader entities typically determine whether there are any new messages to retrieve by constantly polling the trace buffer; depending on the quantity of readers continually accessing the buffer, such activity could completely exhaust system resources.

Specifically, reader entities poll for new message fragments using their private copies of the fragment allocation counter 702 to detect when they have read as many fragments as possible. If a private copy matches the counter contents, the reader has reached the youngest fragment in the trace buffer and that reader entity transitions to an "idle" state. In addition, if a reader encounters a "0"-valued sequence number in a fragment, the reader knows a writer was interrupted and proceeds to transition to its idle state (subject, of course, to the time-out mechanism described above). Finally, if a sequence number is encountered in the youngest fragment that indicates the fragment is "older" than the time-out period, then a writer entity was interrupted between allocating a message sequence number and "zeroing" the sequence number in the fragment entry; accordingly, the reader can transition to its idle state.

Figure 9:
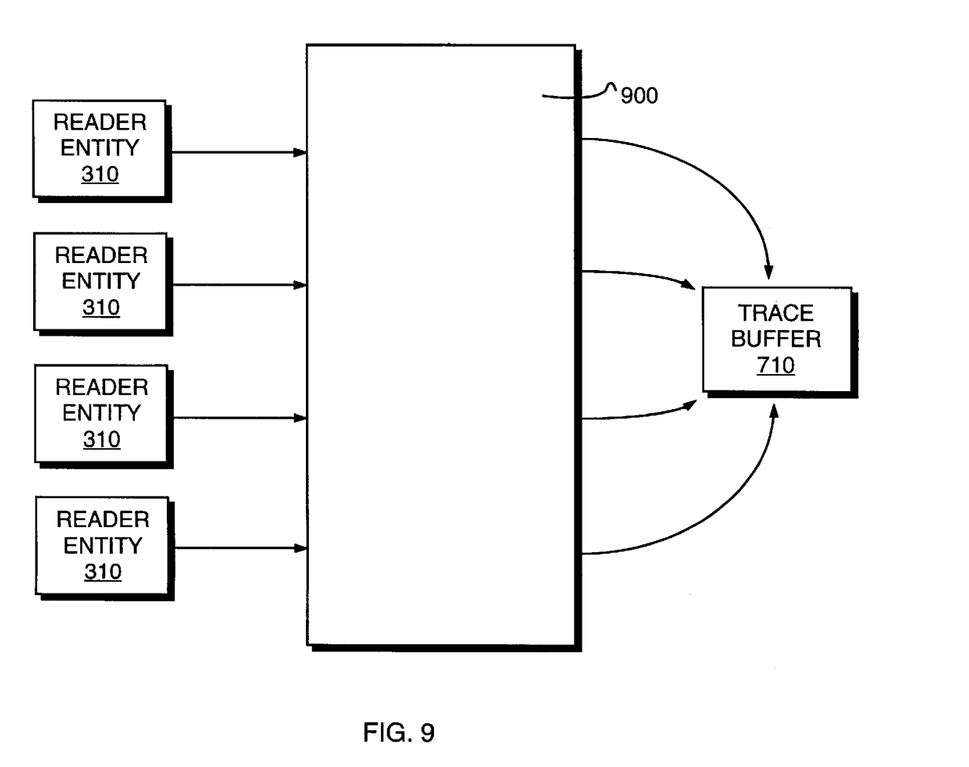
FIG. 9 is a highly schematized block diagram of a barrier synchronizer for limiting the number of reader entities constantly accessing the trace buffer to retrieve trace messages posted by the writer entities.

Referring to FIG. 9, the novel synchronization arrangement further includes a barrier synchronizer 900 for limiting the number of reader entities 310 constantly accessing the trace buffer 710 to retrieve trace messages posted by the writer entities. In this aspect of the invention, the synchronization arrangement operates to block the readers at periodic intervals in order to conserve system resources. The barrier is preferably implemented as a lock mechanism that periodically "awakens" reader entities suspended in idle states waiting to access the trace buffer. In other words, the reader entities transition to active, execution states as the barrier 900 is "lifted" in response to an event, such as the loading of a certain number of message fragments. Reader entities not currently blocked at the barrier are unaffected.

Advantageously, the synchronization arrangement described herein increases the efficiency of a computer system during performance information collection by ensuring that writer entities do not block other writer entities from accessing an information resource. In addition, the novel arrangement regulates the "overhead" associated with retrieving information from an information resource by limiting the number of reader entities constantly accessing that resource.

While there has been shown and described illustrative embodiments of a synchronization arrangement for providing writer and reader entities access to an information resource, it is to be understood that various other adaptations and modifications may be made within the spirit and scope of the invention. For example, the barrier may be implemented using a semaphore as a primitive synchronization mechanism and a timer may used to trigger "dropping" and lifting of the barrier.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A synchronization arrangement for use by reader and writer entities executing on a computer having a memory, the synchronization arrangement comprising:

an information resource located in the memory of the computer, the information resource having a plurality of entries and being accessible by the reader and writer entities;

a first counter operatively coupled to the writer entities for having atomic increments performed thereon, the first counter configured to allocate a specific entry of the information resource to a given writer entity in response to the performance of an atomic increment by the given writer entity, the resource entries temporarily storing messages sequentially posted by the writer entities;

means for limiting allocation of the entries of the information resource to the writer entities except through the first counter; and a reassembly queue for temporarily storing messages sequentially retrieved from the resource by the reader entities, wherein only one writer entity, at any given time, is allocated a specific entry of the information resource.

2. The synchronization arrangement of claim 1 further comprising a time-out mechanism for detecting incomplete messages retrieved from the resource, the time-out mechanism comprising a predetermined threshold established by contents of the first counter, wherein a message is incomplete if it is not completely retrieved by a reader entity before the contents of the first counter exceed the predetermined threshold.

3. The synchronization arrangement of claim 2 wherein the message is a trace message apportioned into a plurality of fragments prior to storage in the resource and wherein the resource is a trace buffer comprising a fixed number of equally-sized entries, each having a capacity sufficient to store one of the fragments.

4. The synchronization arrangement of claim 3 wherein each fragment contains a fragment number and a sequence number, the sequence number being sequentially assigned to each message prior to being apportioned into fragments by a second counter.

5. The synchronization arrangement of claim 4 wherein the first counter is a fragment allocation counter and the second counter is a sequence allocation counter, and wherein a sequence number of zero is an invalid sequence number that signifies copying of a fragment into a trace buffer entry.

6. The synchronization arrangement of claim 1 further comprising a barrier synchronizer for limiting the number of reader entities accessing the resource to retrieve messages posted by the writer entities, wherein the number of reader entities with access to the resource is two or more but less than all of the reader entities.

7. The synchronization arrangement of claim 6 wherein the barrier synchronizer comprises a lock mechanism that periodically notifies the reader entities as to when access to the resource is available.

8. The synchronization arrangement of claim 3 wherein the predetermined threshold is half the number of entries of the trace buffer.

9. A method for providing reader and writer entities access to a trace buffer located in a memory of a computer to reliably exchange complete trace messages, the method comprising the steps of:

allocating entries of the trace buffer to the writer entities using a counter responsive to atomic increments thereon, the trace buffer entries temporarily storing trace messages sequentially provided by the writer entities;

temporarily storing the trace messages sequentially retrieved from the trace buffer by the reader entities using a reassembly queue; and detecting incomplete trace messages retrieved from the trace buffer using a time-out mechanism comprising a predetermined threshold established by contents of the counter, wherein a trace message is incomplete if it is not completely retrieved by a reader entity before the contents of the counter exceed the predetermined threshold.

10. The method of claim 9 further comprising the step of apportioning the trace message into a plurality of fragments prior to storage in the trace buffer.

11. The method of claim 10 further comprising the step of limiting the number of reader entities accessing the trace buffer to retrieve trace message fragments posted by the writer entities using a barrier synchronizer, wherein the number of reader entities with access to the resource is two or more but less than all of the reader entities.

12. The method of claim 10 further comprising the steps of:

synchronizing access by the reader entities to the trace messsage fragments contained in the trace buffer entries; and synchronizing copying of the trace message fragments by the writer entities into the trace buffer.

13. The method of claim 12 wherein the step of synchronizing access further comprises the steps of:

examining the value of a sequence number of a fragment in a trace buffer entry;

if the sequence number value is zero, determining that the entry is currently being accessed; and if the sequence number changes while the fragment is being read, determining that the fragment is overwritten.

14. The method of claim 12 wherein the step of synchronizing copying further comprises the steps of:

signaling a busy status of a fragment in a trace buffer entry using a sequence number of the fragment;

writing a value of zero to a sequence number field of the fragment prior to copying the fragment to the trace buffer entry; and writing a non-zero value to the sequence number field in response to completing copying of the fragment to the trace buffer entry, the non-zero sequence value being allocated to a trace message of the fragment.

15. The synchronization arrangement of claim 1 wherein the first counter defines corresponding contents and a writer entity, having control of the first counter, either increments or decrements its corresponding contents and performs an operation on the resulting contents to identify the entry of the information resource being allocated.

16. The synchronization arrangement of claim 15 wherein the operation is a modulo operation.

17. The synchronization arrangement of claim 1 further wherein multiple writer entities can access the information resource simultaneously.

* * * * *